US011953985B1

United States Patent
Narendra et al.

(10) Patent No.: US 11,953,985 B1
(45) Date of Patent: Apr. 9, 2024

(54) DIAL-HOME AND TEMPLATE BASED AUTOMATIC RECOVERY OF VIRTUAL MACHINE GUEST OPERATING SYSTEM

(71) Applicant: Dell Products, L.P., Hopkinton, MA (US)

(72) Inventors: Viveka Narendra, Bangalore (IN); Shefali T Kulkarni, S Kodagu (IN)

(73) Assignee: Dell Products, L.P., Hopkinton, MA (US)

( * ) Notice: Subject to any disclaimer, the term of this patent is extended or adjusted under 35 U.S.C. 154(b) by 78 days.

(21) Appl. No.: 17/966,928

(22) Filed: Oct. 17, 2022

(51) Int. Cl.
*G06F 11/00* (2006.01)
*G06F 9/455* (2018.01)
*G06F 11/07* (2006.01)

(52) U.S. Cl.
CPC ...... *G06F 11/0793* (2013.01); *G06F 9/45558* (2013.01); *G06F 11/0712* (2013.01); *G06F 2009/45591* (2013.01)

(58) Field of Classification Search
CPC ............. G06F 11/0712; G06F 11/0793; G06F 9/45558; G06F 2009/45591; G06F 11/0772; G06F 11/2252; G06F 11/2257
See application file for complete search history.

(56) References Cited

U.S. PATENT DOCUMENTS

| 8,949,669 B1 * | 2/2015 | Khokhar | G06F 11/0727 714/48 |
| 2023/0132033 A1 * | 4/2023 | Gupta | G06F 16/93 717/120 |
| 2023/0308342 A1 * | 9/2023 | Rathinam | H04L 41/0631 |

\* cited by examiner

*Primary Examiner* — Marc Duncan
(74) *Attorney, Agent, or Firm* — Anderson Gorecki LLP

(57) ABSTRACT

Template based automatic recovery of virtual machine guest operating systems is provided, that is configured to execute recovery operations within a virtual machine in response to generation of dial-home messages. The error recovery operations, in some embodiments, are based on error recovery templates that specify dial-home event specific sequences of diagnostic operations and actions to be taken to attempt to recover from the errors that cause the dial-home events. By enabling the virtual machine to internally recover automatically from at least a subset of dial-home errors, it is possible to greatly reduce the support cost associated with providing support services for maintaining operation of storage systems. Additionally, enabling automatic recovery of particular errors can reduce the amount of time the storage system or particular aspects of the storage system are inoperable, thus increasing the reliability of the storage system.

20 Claims, 4 Drawing Sheets

FIG. 3

Error Recovery Data Structure 230

| Dial-Home Message Type 305 | Template Version 310 | Recoverable Flag 315 | Error Recovery Process (Tests and Action sequences) 320 | | |
|---|---|---|---|---|---|
| Error Recovery Template #1121 | 2.2.6 | Yes | Check log for X | ••• | Restart Application |
| Error Recovery Template #1122 | 2.2.9 | Yes | Check log for Y | ••• | Change value Z |
| ••• | ••• | ••• | ••• | ••• | ••• |
| Error Recovery Template #1255 | 2.1.4 | No | - | ••• | - |

DIAL-HOME AND TEMPLATE BASED AUTOMATIC RECOVERY OF VIRTUAL MACHINE GUEST OPERATING SYSTEM

FIELD

This disclosure relates to computing systems and related devices and methods, and, more particularly, to a method and apparatus for template based automatic recovery of virtual machine guest operating system in response to generation of a dial-home message.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Storage systems are complicated computer systems that may have hundreds of applications concurrently executing to implement particular storage operations in connection with storing and protecting customer data. These complicated systems occasionally encounter execution errors, which require resolution to restore the storage system to a correct operational state. To facilitate resolution of issues that are detected on the storage system, in some embodiments the storage system includes a notification system configured to notify customer support that a failure has occurred. This enables a dedicated team of professional customer support personnel, who are trained to work on the storage system, to be notified of failures and to take corrective action to restore operation of the storage system.

One example failure notification system is referred to herein as a "Dial-Home" system. When a failure occurs, a "dial-home" message is generated by the storage system that identifies the type of failure, the time of failure, and other relevant information. In some embodiments, a dial-home system on the storage system detects errors or failures in certain workflows or activities, and sends dial-home messages to the support team for review and recovery.

Dial-home events come at a cost to the company that is providing the support services, and also impact the customer experience. Specifically, some dial-home events can cause particular aspects of the storage system to be disabled until resolved, which can affect the customer's use of the storage system. According to some embodiments, a method and apparatus for template based automatic recovery of virtual machine guest operating systems is provided, that is configured to execute recovery operations within the virtual machine in response to generation of a dial-home messages. The error recovery operations, in some embodiments, are implemented by recovery script executing in the context of the guest operating system and based on error recovery templates that specify sequences of diagnostic operations and actions to be taken to attempt to recover from the error that caused the dial-home event. By enabling the virtual machine to recover automatically from at least a subset of dial-home errors, it is possible to greatly reduce the support cost associated with providing support services for maintaining operation of storage systems. Additionally, enabling automatic recovery of particular errors can reduce the amount of time the storage system or particular aspects of the storage system are inoperable, thus increasing the reliability of the storage system.

BRIEF DESCRIPTION OF THE DRAWINGS

FIG. 3 is a functional block diagram of an example error recovery data structure, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
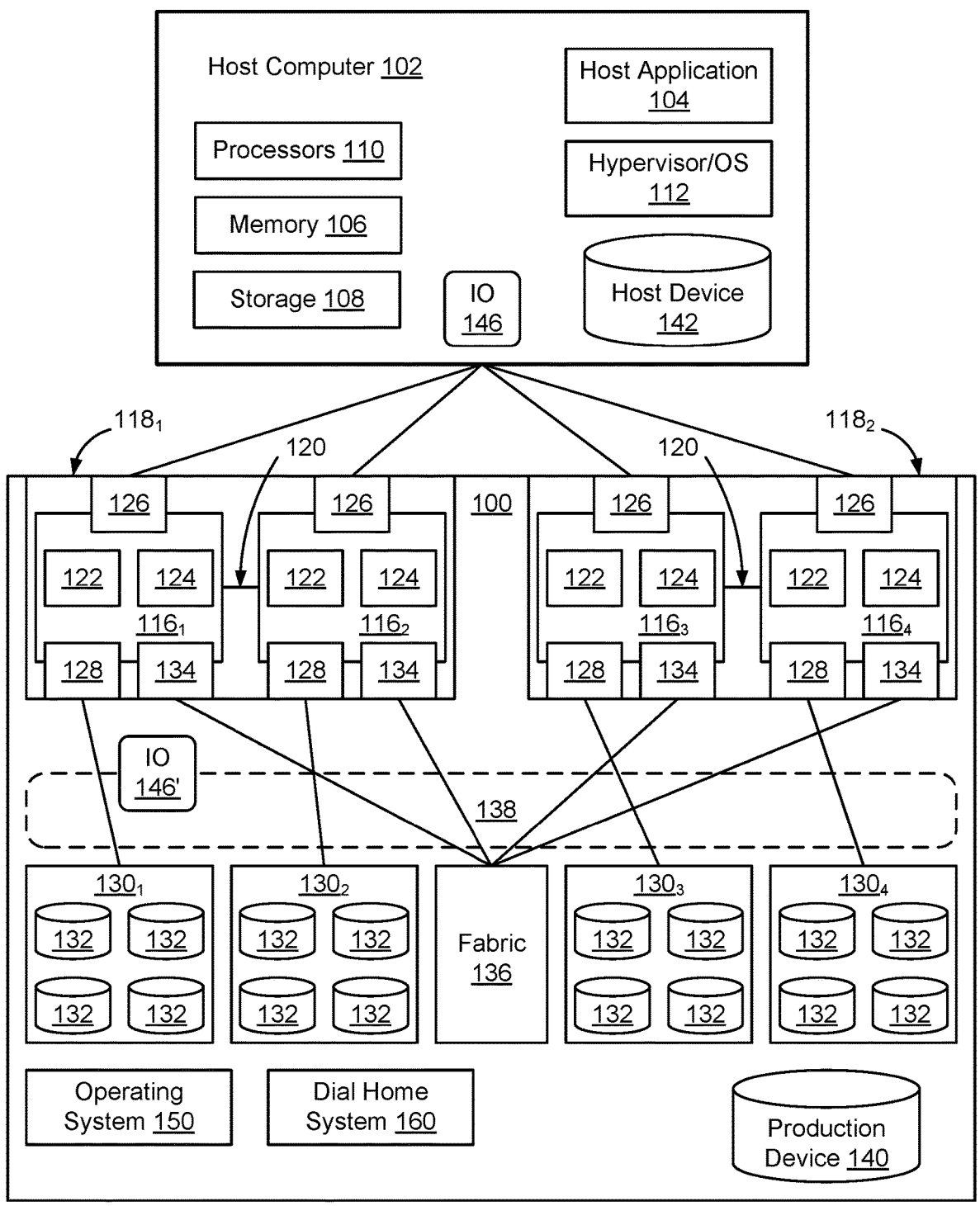
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Figure 2:
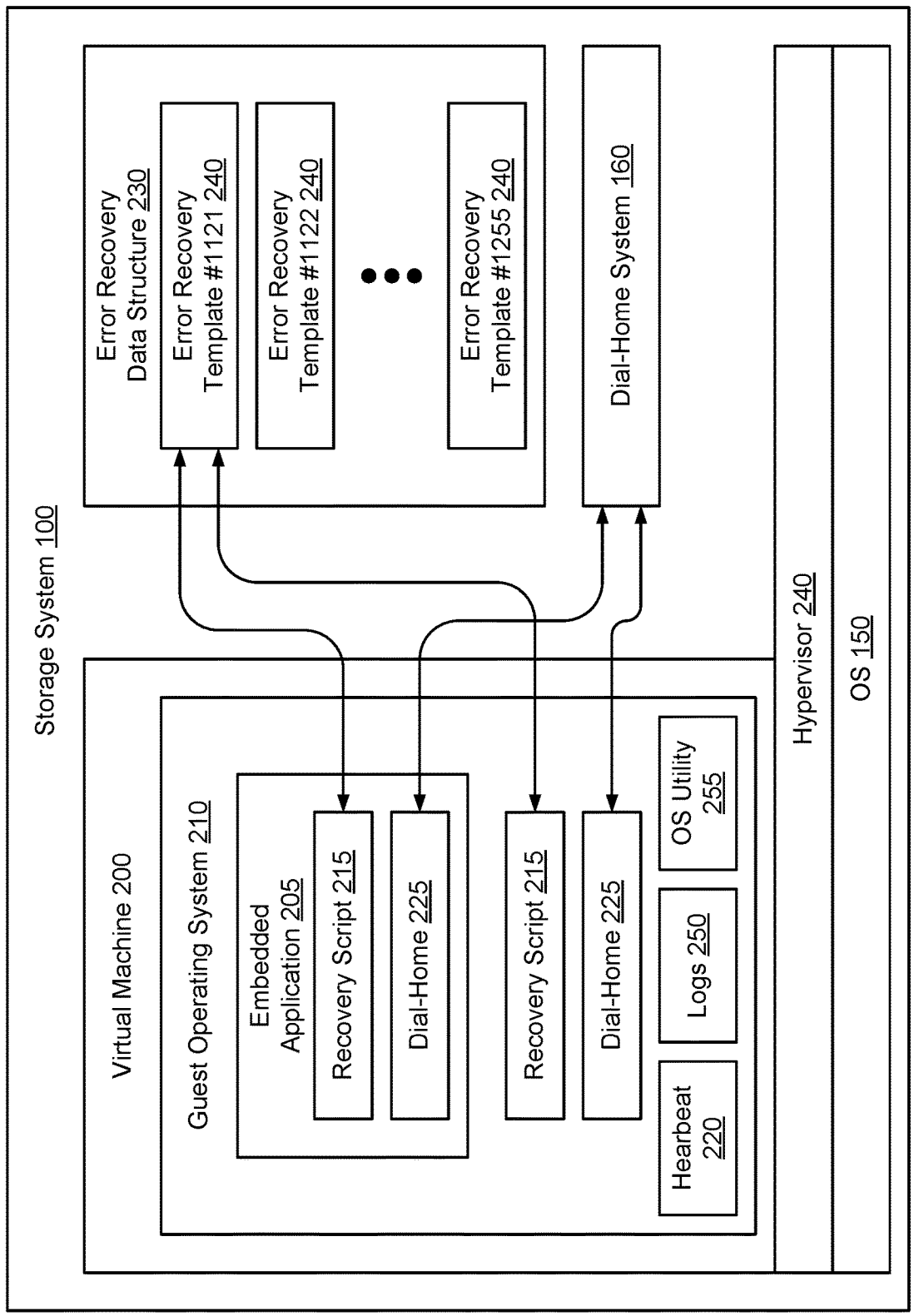
FIG. 2 is a functional block diagram of an example storage system of FIG. 1, showing implementation of a virtual machine having a guest operating system, an embedded application, and an automated error recovery system, according to some embodiments.

FIG. 2 is a functional block diagram of an example storage system of FIG. 1, showing implementation of a virtual machine having a guest operating system, an embedded application, and an automated error recovery system, according to some embodiments. As shown in FIG. 2, in some embodiments the storage system has an operating system 150 and a hypervisor 240 that abstracts hardware resources of the storage system (described in connection with FIG. 1) from one or more virtual machines 200. Each virtual machine 200 includes a guest operating system 210 and one or more embedded applications 205 executing in the context of the guest operating system 210.

In some embodiments, the guest operating system 210 includes a dial-home system 225 that is configured to detect errors that occur within the virtual machine, such as an error in execution of embedded application 205 or an error in the guest operating system 210. When an error is detected, the dial-home system 225 generates and transmits a dial-home message, for example to the dial-home system 160 of the storage system 100, to instruct the dial-home system 160 on the storage system 100 to transmit a dial-home message to customer support. For example, in some embodiments, multiple instances of a given embedded application 205 will be instantiated in separate virtual machines 200 for redundancy purposes. The several instances of the embedded application 205 may use a heartbeat mechanism 220 to enable the backup instances of the embedded application to determine whether the primary instance of the application is still operational. A failure of the heartbeat mechanism is one example failure that may be detected and cause generation of a dial-home message by dial-home system 225. There are many types of errors that may occur within a virtual machine, which may be associated with execution of the embedded application, in the guest operating system itself, or associated with resources assigned for use by the virtual machine (e.g., storage resources assigned to the virtual machine), depending on the implementation.

According to some embodiments, if a dial-home message is generated by dial-home system 225, a recovery script 215 executing in the context of the guest operating system 210 is used to attempt to automatically recover from the dial-home error. As shown in FIG. 2, when a dial-home message is generated, in some embodiments the recovery script 215 determines the type of error that caused generation of the dial-home message, and uses the error type to access an error recovery template 240 associated with the error type. The error recovery templates 240 may be stored, for example, in an error recovery data structure 230, depending on the implementation. An example error recovery data structure 230 is shown in FIG. 3. The error recovery data structure 230 may be maintained in storage resources outside of the virtual machine 200, may be stored in a storage volume that is mapped to the virtual machine, or may be stored elsewhere in the storage system depending on the implementation. As used herein, the term error recovery system is formed from the combination of the recovery script 215 executing in the context of the guest operating system 210, and the error recovery templates 240 maintained by the error recovery data structure 230. As shown in FIG. 2, in some embodiments the error recovery script and dial-home system are implemented in both the embedded application 205 and in the guest operating system 210.

In some embodiments, every dial-home error that has the possibility to recover without intervention from customer support is associated with an error recovery template 240. Each error recovery template 240 has a script that describes an error recovery process 320 that should be implemented by the recovery script 215 inside the virtual machine 200 to enable the recovery script 215 to attempt to recover from the system error automatically, without user intervention. Since the recovery script 215 is executing locally, in the context of the guest operating system 210 within the virtual machine, the recovery script 215 has access to logs 250 and other data structures maintained by the guest operating system 205, and can interact with an operating system utility 255 to change the manner in which the guest operating system is executing or the local environment in which the embedded application 205 is executing.

By using error recovery templates 240 that are configured to describe error recovery processes that are specific to the type of errors that cause the dial-home events, the recovery script 215 is flexible and able to be used in connection with multiple types of error events. Specifically, since different error recovery templates are associated with different dial-home events, the recovery script 215 is able to access the error recovery template based on the type of dial-home event, and then execute the error recovery process specified by the error recovery template 240. This enables the recovery script 215 to be configured to perform an error-specific error recovery process after occurrence of a dial-home event, such that the recovery script 215 is able to implement the error-specific process designed to recover the embedded application 205 and guest operating system 210 within virtual machine 200. In some embodiments, as solutions are created for dial-home events, new error recovery templates are generated and populated to the error recovery data structure 230 to enable new types of dial-home errors to be automatically corrected by the recovery script 215.

FIG. 3 is a functional block diagram of an example error recovery data structure 230, according to some embodiments. As shown in FIG. 3, in some embodiments the error recovery data structure 230 includes a set of error recovery templates, each error recovery template being associated with a particular type of dial-home message 305. Each error recovery template includes information enabling the type of error associated with the template to be identified and optionally information about the template version 310.

As shown in FIG. 3, in some embodiments each template includes an error recovery process 320 describing sequences of diagnostic operations and actions that the recovery script 215 should implement on the guest operating system 210 and/or embedded application 205 within the virtual machine 200. The order of the diagnostic operations, and the types of actions to be implemented, in some embodiments are interdependent. For example, an error recovery process of a particular error recovery template might instruct the recovery script 215 to test for a particular condition, and based on the result of that test, take either action A or action B, and then run additional tests and take additional actions. Additionally, the error recovery process 230 of an error recovery template might specify actions and subsequent diagnostic operations to be implemented to enable the recovery script 215 to determine the outcome of the action to ensure that the action was successful. The error recovery template can therefore contain scripts with multiple testing nodes and action branches depending on the particular script that is to be executed by the recovery script 215 to attempt to recover from the error that caused generation of the dial-home message.

As shown in FIG. 3, not all error types are recoverable. Accordingly, in some embodiments, the error recovery templates include a field or a flag 315 identifying the error type as either recoverable or not recoverable. Likewise, particular errors may be recoverable in certain conditions and not recoverable in other conditions. For example, the error recovery template might instruct the recovery script 215 to test for a particular condition, and based on the result of that test, determine that the error is either recoverable or not recoverable. Accordingly, the recoverable/not recoverable indication might be implemented using one or more of the action fields of the error recovery template, depending on the implementation.

Figure 4:
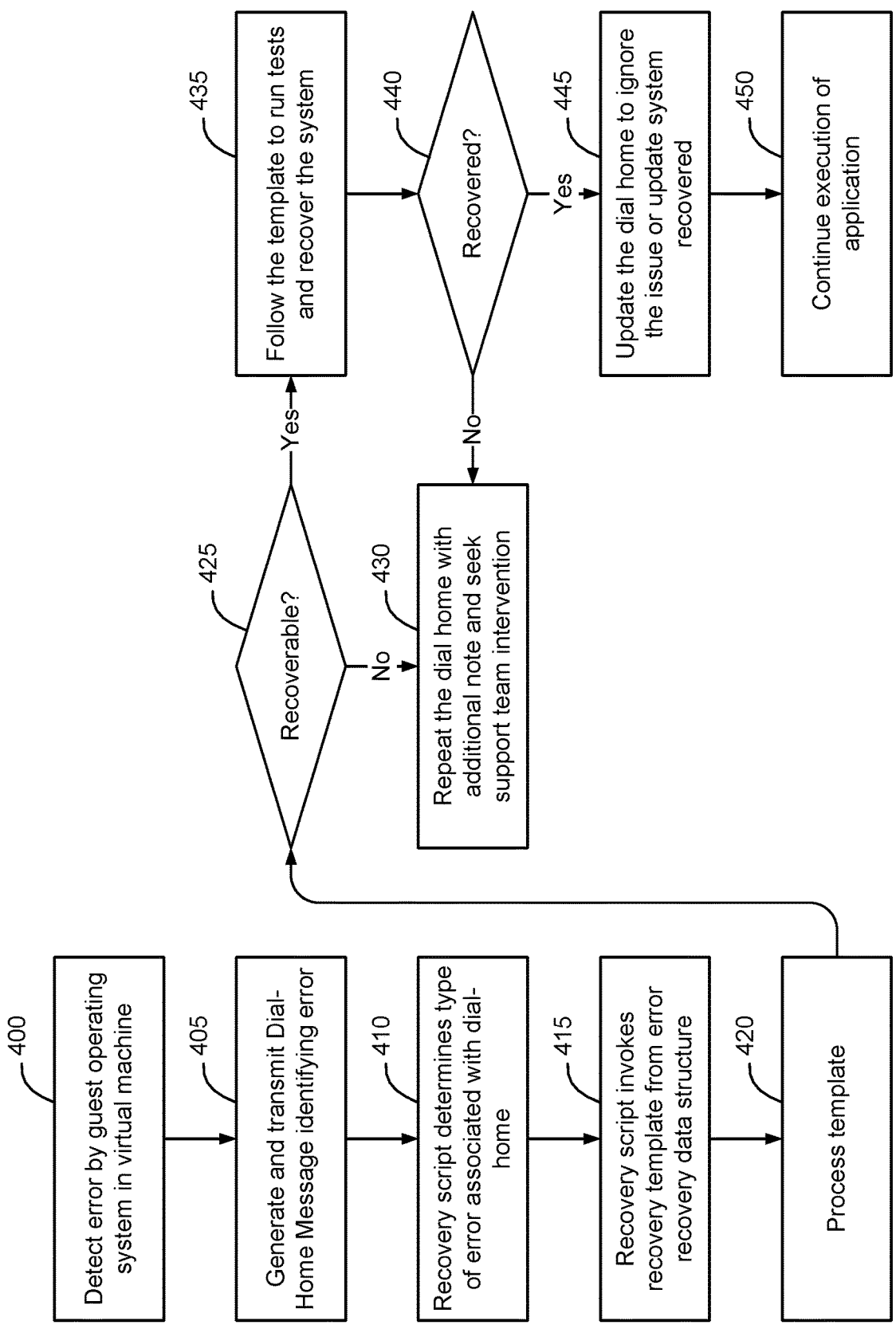
FIG. 4 is a flow chart of an example process of implementing template based automatic recovery of a virtual machine guest operating system in response to generation of a dial-home message, according to some embodiments.

FIG. 4 is a flow chart of an example process of implementing template based automatic recovery of a virtual machine guest operating system in response to generation of a dial-home message, according to some embodiments. As shown in FIG. 4, when an error is detected in execution of an embedded application 205 or in the guest operating system 210 of a virtual machine 200 (block 400), a dial-home message is generated and transmitted (block 405). In some embodiments, the dial-home message identifies the error and may contain information gleaned from logs generated by the embedded application 205 and/or operating system 210 to provide context for the error identified in the dial-home message.

When a dial-home message is generated, the recovery script 215 determines the type of error associated with the dial-home message (block 410) and the recovery script invokes an error recovery template 240 associated with the dial-home message from the error recovery data structure 230 (block 415).

The recovery script 215 then processes the error recovery template (block 420). In some embodiments, the recovery script 215 reads the recoverable tag 315 of the retrieved error recovery template 240 to determine if the error that prompted generation of the dial-home is recoverable (block 425). If the error that prompted generation of the dial-home is not recoverable (a determination of NO at block 425), in some embodiments the dial-home message is repeated, optionally with an additional note that the error was deemed to not be recoverable by the automatic recovery system.

If the error that prompted generation of the dial-home is recoverable (a determination of YES at block 425), the recovery script 215 follows the error recovery process (the set of tests and action sequences) 320 of the selected error recovery template 240 to attempt to recover the system (block 435).

After executing the error recovery process, the error recovery script 215 determines whether the error has been recovered (block 440). If the error has been recovered (a determination of YES at block 440), the dial-home message is updated to identify the error as having been resolved by the error recovery system. This enables the customer service to ignore the original dial-home message or to update the customer service system to indicate that the original dial-home event has been resolved (block 445). After recovery of the error that caused the dial-home message to be generated, the embedded application 205 is able to continue execution (block 450).

If the error has not been recovered after the recovery script 215 implements the set of tests and actions defined by the error recovery process 320 (a determination of NO at block 440), in some embodiments the dial-home message is repeated, optionally with an additional note that the error was deemed to not be recoverable by the automatic recovery system (block 430).

In some embodiments, each dial-home event that has the possibility to recover with a few steps is associated with a template, which has scripts to run tests and recover the system automatically without any user intervention. For example, if the guest OS is not responsive, the watchdog system can cause to Guest OS to reboot after sending the dial-home message. When the dial-home message is detected, the recovery script will obtain an error recovery template for the dial-home message, and check for a recoverable flag in the template file. Upon determining that the error is recoverable, the recovery script 215 runs specific Check Health tests on the guest OS 210 and embedded application 205. If the tests report all the systems are normal, with no errors in the guest OS, the recovery script 215 will return "success" and reissue an Information dial-home that the system is health and the previous dial-home message can be ignored and that no support team engagement is required. If the tests report the continued occurrence of an error or exception, the dial-home message would be reinitiated, which can also result in an escalation of the original dial-home message within the customer support center.

As another example, a dial-home event may occur in connection with a lack of memory resources, such as in connection with a disk being full which causes a guest upgrade to fail. If this type of dial-home event occurs, the recovery script 215 will obtain the dial-home specific error recovery template 240, and check the recoverable flag 315 to determine if the error is recoverable. In this example, it is assumed that the template has this type of error flagged as recoverable, and the recovery script 215 will implement the error recovery process 320 of the error recovery template. For example, the recovery script 215 might initiate tests to identify which disks in the guest are full, and based on the rules in the template, these files would be copied to another persistent storage device or LUN. The recovery script 215 might then clean up the drives, and update the Guest OS parameters to unblock the upgrades. If the recovery is successful, the recovery script will cause a second dial-home message to be generated, indicating that the upgrade was successful and that customer support intervention is not required.

As another example, during product engineering, an intermittent issue is occasionally observed which might be difficult to reproduce and, accordingly, difficult to systemically fix. However, a recovery procedure might be available such that, when a dial-home message is generated based on this intermittent issue, the recovery procedure is able to be implemented to correct the system. By creating a template, and enabling the recovery script to automatically implement the recovery procedure, it is possible to implement a set of non-intrusive recovery steps whenever the intermittent error occurs until the root cause of the intermittent error is able to be corrected in a subsequent software release.

As yet another example, as noted in connection with FIG. 2, in some embodiments a heartbeat system is used to enable multiple nodes, e.g. multiple virtual machines of a cluster, to verify continued operation of the nodes. However, an intermittent network or system issue may cause the heartbeat mechanism to fail, even where all of the nodes of the cluster are still operational. This loss of heartbeat will be reported using dial-home message as a cluster failure. However, eventually when the network connectivity is restored, or the heartbeat is otherwise restored, the cluster will revert back to normal operation. By causing recovery script 215 to access an error recovery template that identifies particular health checks that should be implemented on the virtual machine 200, it is possible for the recovery script 215 to report back via a second dial-home message that the embedded application and guest OS of the virtual machine are functioning properly, to thereby enable a network failure or other failure in the heartbeat mechanism to be distinguished from failure of one of the nodes of the cluster.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for template based automatic recovery of a virtual machine guest operating system in response to generation of a dial-home message, the computer program including a set of instructions which, when executed by a computer, cause the computer to perform a method comprising the steps of:

detecting generation of a first dial-home message, the first dial-home message identifying an error associated with the virtual machine guest operating system or an application executing in the context of the virtual machine guest operating system;

in response to detecting generation of the first dial-home message, obtaining an error recovery template specific to the first dial-home message by a recovery script executing in the context of the virtual machine guest operating system, the error recovery template including an error recovery process specifying a collection of diagnostic operations and actions to be implemented by the recovery script;

implementing the error recovery process by the recovery script within the virtual machine;

determining, by the recovery script, whether implementing the error recovery process corrected the error associated with the virtual machine guest operating system or the application executing in the context of the virtual machine guest operating system;

in response to a determination by the recovery script that the error recovery process did not correct the error, generating a second dial-home message identifying the error associated with the first dial-home message as having not been corrected by the recovery script; and in response to a determination by the recovery script that the error recovery process did correct the error, generating a third dial-home message identifying the error associated with the first dial-home message as having been corrected by the recovery script.

2. The non-transitory tangible computer readable storage medium of claim 1, wherein the error recovery template is selected from a set of error recovery templates, each error recovery template being associated with a particular type of dial-home message.

3. The non-transitory tangible computer readable storage medium of claim 1, wherein the set of error recovery templates is stored in an error recovery template database external to the virtual machine.

4. The non-transitory tangible computer readable storage medium of claim 1, wherein the error recovery process specifies an interdependent order of the diagnostic operations and the types of actions to be implemented by the error recovery script.

5. The non-transitory tangible computer readable storage medium of claim 4, wherein the interdependent order includes specifying a first of the actions and a subsequent first of the diagnostic operations to be implemented in response to execution of the first action to enable the error recovery process to determine the outcome of the first action to ensure that the first action was successful.

6. The non-transitory tangible computer readable storage medium of claim 4, wherein the interdependent order includes specifying a first of the diagnostic operations to be implemented and, dependent on the result of the first diagnostic operation, performance of either a first action or a second action.

7. The non-transitory tangible computer readable storage medium of claim 1, wherein the error recovery template includes an indication that the error is not recoverable.

8. The non-transitory tangible computer readable storage medium of claim 7, further comprising, in response to determining by the recovery script that the error recovery template includes an indication that the error is not recoverable, generating the second dial-home message identifying the error as having not been corrected by the recovery script.

9. The non-transitory tangible computer readable storage medium of claim 1, further comprising sending the first dial-home message via a dial-home system to a customer support system external to the virtual machine.

10. The non-transitory tangible computer readable storage medium of claim 9, further comprising sending the second dial-home message or the third dial-home message via the dial-home system to the customer support system.

11. A method of template based automatic recovery of a virtual machine guest operating system in response to generation of a dial-home message, comprising:
   detecting generation of a first dial-home message, the first dial-home message identifying an error associated with the virtual machine guest operating system or an application executing in the context of the virtual machine guest operating system;
   in response to detecting generation of the first dial-home message, obtaining an error recovery template specific to the first dial-home message by a recovery script executing in the context of the virtual machine guest operating system, the error recovery template including an error recovery process specifying a collection of diagnostic operations and actions to be implemented by the recovery script;
   implementing the error recovery process by the recovery script within the virtual machine;
   determining, by the recovery script, whether implementing the error recovery process corrected the error associated with the virtual machine guest operating system or the application executing in the context of the virtual machine guest operating system;
   in response to a determination by the recovery script that the error recovery process did not correct the error, generating a second dial-home message identifying the error associated with the first dial-home message as having not been corrected by the recovery script; and
   in response to a determination by the recovery script that the error recovery process did correct the error, generating a third dial-home message identifying the error associated with the first dial-home message as having been corrected by the recovery script.

12. The method of claim 11, wherein the error recovery template is selected from a set of error recovery templates, each error recovery template being associated with a particular type of dial-home message.

13. The method of claim 11, wherein the set of error recovery templates is stored in an error recovery template database external to the virtual machine.

14. The method of claim 11, wherein the error recovery process specifies an interdependent order of the diagnostic operations and the types of actions to be implemented by the error recovery script.

15. The method of claim 14, wherein the interdependent order includes specifying a first of the actions and a subsequent first of the diagnostic operations to be implemented in response to execution of the first action to enable the error recovery process to determine the outcome of the first action to ensure that the first action was successful.

16. The method of claim 14, wherein the interdependent order includes specifying a first of the diagnostic operations to be implemented and, dependent on the result of the first diagnostic operation, performance of either a first action or a second action.

17. The method of claim 11, wherein the error recovery template includes an indication that the error is not recoverable.

18. The method of claim 17, further comprising, in response to determining by the recovery script that the error recovery template includes an indication that the error is not recoverable, generating the second dial-home message identifying the error as having not been corrected by the recovery script.

19. The method of claim 11, further comprising sending the first dial-home message via a dial-home system to a customer support system external to the virtual machine.

20. The method of claim 19, further comprising sending the second dial-home message or the third dial-home message via the dial-home system to the customer support system.

* * * * *